(12) United States Patent
Notsu

(10) Patent No.: US 11,420,480 B2
(45) Date of Patent: Aug. 23, 2022

(54) TYRE

(71) Applicant: Sumitomo Rubber Industries, Ltd., Hyogo (JP)

(72) Inventor: Ryoji Notsu, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 233 days.

(21) Appl. No.: 16/779,688

(22) Filed: Feb. 3, 2020

(65) Prior Publication Data
US 2020/0298629 A1    Sep. 24, 2020

(30) Foreign Application Priority Data

Mar. 20, 2019 (JP) .............................. JP2019-053420

(51) Int. Cl.
*B60C 11/03* (2006.01)
*B60C 11/11* (2006.01)
(Continued)

(52) U.S. Cl.
CPC ...... *B60C 11/1369* (2013.01); *B60C 11/0306* (2013.01); *B60C 11/11* (2013.01); *B60C 11/1204* (2013.01); *B60C 11/125* (2013.01); *B60C 11/1307* (2013.01); *B60C 2011/0346* (2013.01); *B60C 2011/0374* (2013.01); *B60C 2011/0376* (2013.01);
(Continued)

(58) Field of Classification Search
CPC ......... B60C 2011/0346; B60C 11/1369; B60C 2011/0374; B60C 2011/0376; B60C 11/125; B60C 2011/0379; B60C 2011/133; B60C 2011/1338; B60C 11/1307; B60C 11/0306; B60C 11/11; B60C 11/047
See application file for complete search history.

(56) References Cited

U.S. PATENT DOCUMENTS 3,727,661 A * 4/1973 Hoke .................... B60C 11/047
                                                          152/209.22
D907,568 S * 1/2021 Ishigaki ...................... D12/579
(Continued)

FOREIGN PATENT DOCUMENTS

EP    3 000 622 A1    3/2016
EP    3 647 078 A1    5/2020
(Continued)

OTHER PUBLICATIONS

The extended European search report issued by the European Patent Office dated Jul. 27, 2020, which corresponds to European Patent Application No. 20157252.6-1012 and is related to U.S. Appl. No. 16/779,688.

*Primary Examiner* — Robert C Dye
*Assistant Examiner* — Brendon Charles Darby
(74) *Attorney, Agent, or Firm* — Studebaker & Brackett PC

(57) ABSTRACT

A tyre includes a tread portion being provided with two circumferential grooves extending in a tyre circumferential direction to form a crown land portion therebetween. The crown land portion is provided with two or more crown grooves extending inwardly of the crown land portion from the respective circumferential grooves. Each crown groove includes wide-width regions and narrow-width regions having a groove width smaller than that of the wide-width regions, and the wide-width regions and the narrow-width regions are alternated.

17 Claims, 5 Drawing Sheets

Figure 1:
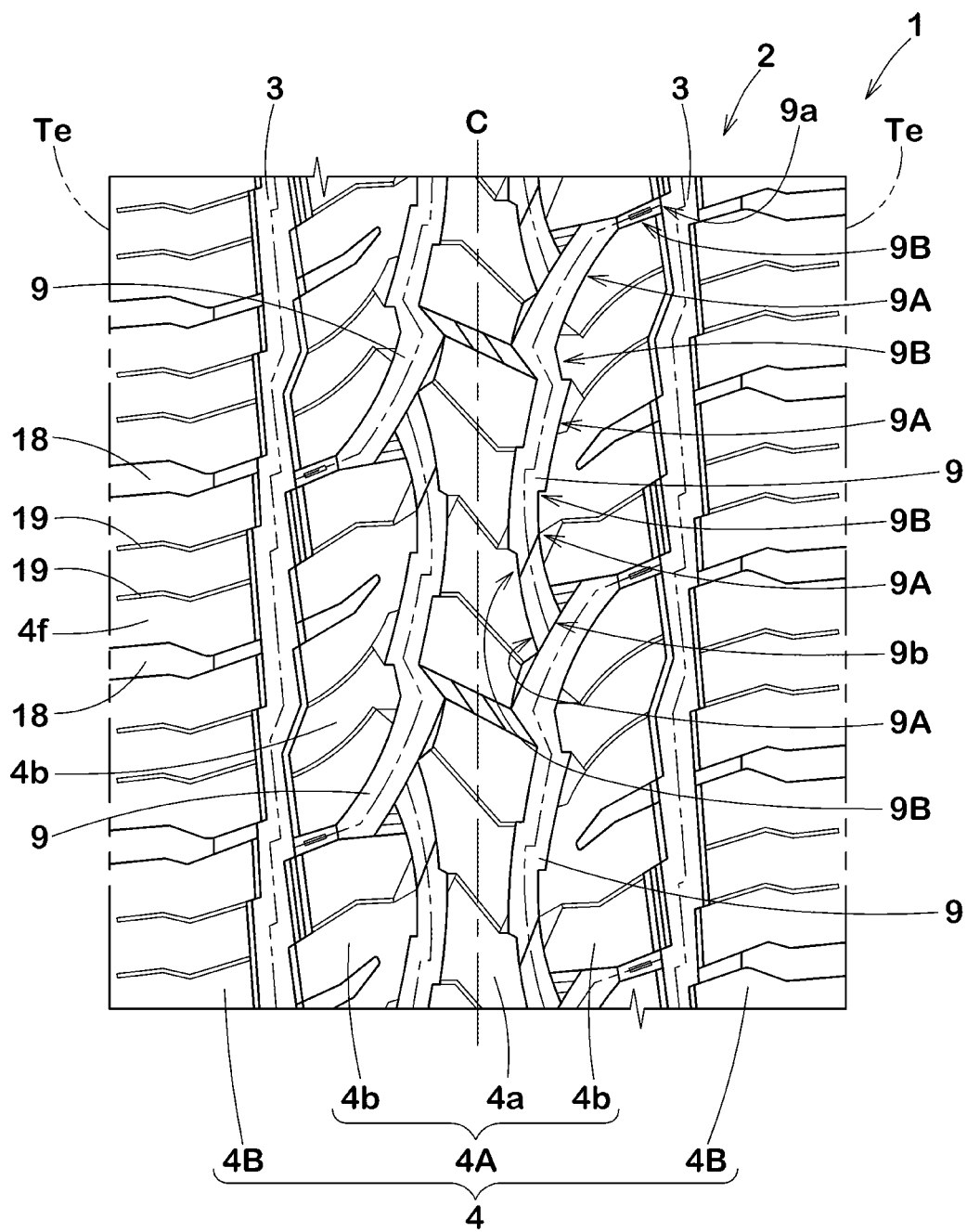

(51) Int. Cl.
 *B60C 11/13* (2006.01)
 *B60C 11/12* (2006.01)

(52) U.S. Cl.
 CPC . *B60C 2011/0379* (2013.01); *B60C 2011/133* (2013.01); *B60C 2011/1338* (2013.01)

(56) References Cited

U.S. PATENT DOCUMENTS

| | | | | |
|---|---|---|---|---|
| 2001/0032691 | A1* | 10/2001 | Ohsawa | B60C 11/047 |
| | | | | 152/209.18 |
| 2012/0073715 | A1* | 3/2012 | Kawauchi | B60C 11/11 |
| | | | | 152/209.18 |
| 2016/0368326 | A1* | 12/2016 | Wakizono | B60C 11/0306 |
| 2017/0210176 | A1 | 7/2017 | Ninomiya et al. | |

FOREIGN PATENT DOCUMENTS

| | | |
|---|---|---|
| JP | 2017-128268 A | 7/2017 |
| WO | 2012/043036 A1 | 4/2012 |
| WO | 2013/015375 A1 | 1/2013 |

* cited by examiner

TYRE

BACKGROUND ART

Field of the Disclosure

The present disclosure relates to a tyre, more particularly to a tyre with a tread portion provided with grooves.

Description of the Related Art

Typically, tread portions of tyres are provided with grooves. For example, the following Patent document 1 discloses a pneumatic tyre which includes a tread portion including a plurality of blocks divided by a plurality of main grooves extending in a zigzag manner in the tyre circumferential direction and a plurality of lateral grooves connecting the main grooves.
[Patent document 1] Japanese Unexamined Patent Application Publication 2017-128268

SUMMARY OF THE DISCLOSURE

Unfortunately, in the tyre disclosed in Patent document 1, the grooves have substantially constant groove widths, and there may be a situation where water in the grooves does not flow smoothly due to viscous resistance of water against groove walls. Thus, the above-mentioned tyre has been a room for improvement of drainage performance. Further, in the tyre disclosed in Patent document 1, difference between stiffness of a portion around the main grooves and stiffness of a portion away from the main grooves becomes large, resulting in uneven wear of the tread portion.

The present disclosure has been made in view of the above problem and has a major object to provide a tyre capable of improving wet performance and uneven wear resistance.

In one aspect of the disclosure, a tyre includes a tread portion being provided with two circumferential grooves extending in a tyre circumferential direction to form a crown land portion therebetween, wherein the crown land portion is provided with two or more crown grooves extending inwardly of the crown land portion from the respective circumferential grooves, each crown groove includes wide-width regions and narrow-width regions having a groove width smaller than that of the wide-width regions, and the wide-width regions and the narrow-width regions are alternated.

In another aspect of the disclosure, each crown groove may include an outer end opening to either one of the circumferential grooves and an inner end being in communication with another one of the crown grooves arranged adjacently in the tyre circumferential direction.

In another aspect of the disclosure, each crown groove may include a first inclined portion extending along the tyre circumferential direction from the inner end, and the first inclined portion may be provided with a crown tie-bar on the inner end side.

In another aspect of the disclosure, each crown groove may include a first axial portion extending along a tyre axial direction from the outer end, and the first axial portion may be provided with a side tie-bar on the outer end side.

In another aspect of the disclosure, the outer end may be formed as one of the narrow-width regions.

In another aspect of the disclosure, the crown land portion may include two or more side blocks defined by the crown grooves and the circumferential grooves, each side block may include a first block sidewall extending along either one of the circumferential grooves, and the first block sidewall may include a step portion extending stepwise in a tyre radial direction.

In another aspect of the disclosure, at least one of the wide-width regions may have a groove width varying in the at least one of the wide-width regions.

In another aspect of the disclosure, at least one of the narrow-width regions may have a groove width varying in the at least one of the narrow-width regions.

DESCRIPTION OF THE PREFERRED EMBODIMENTS

Figure 2:
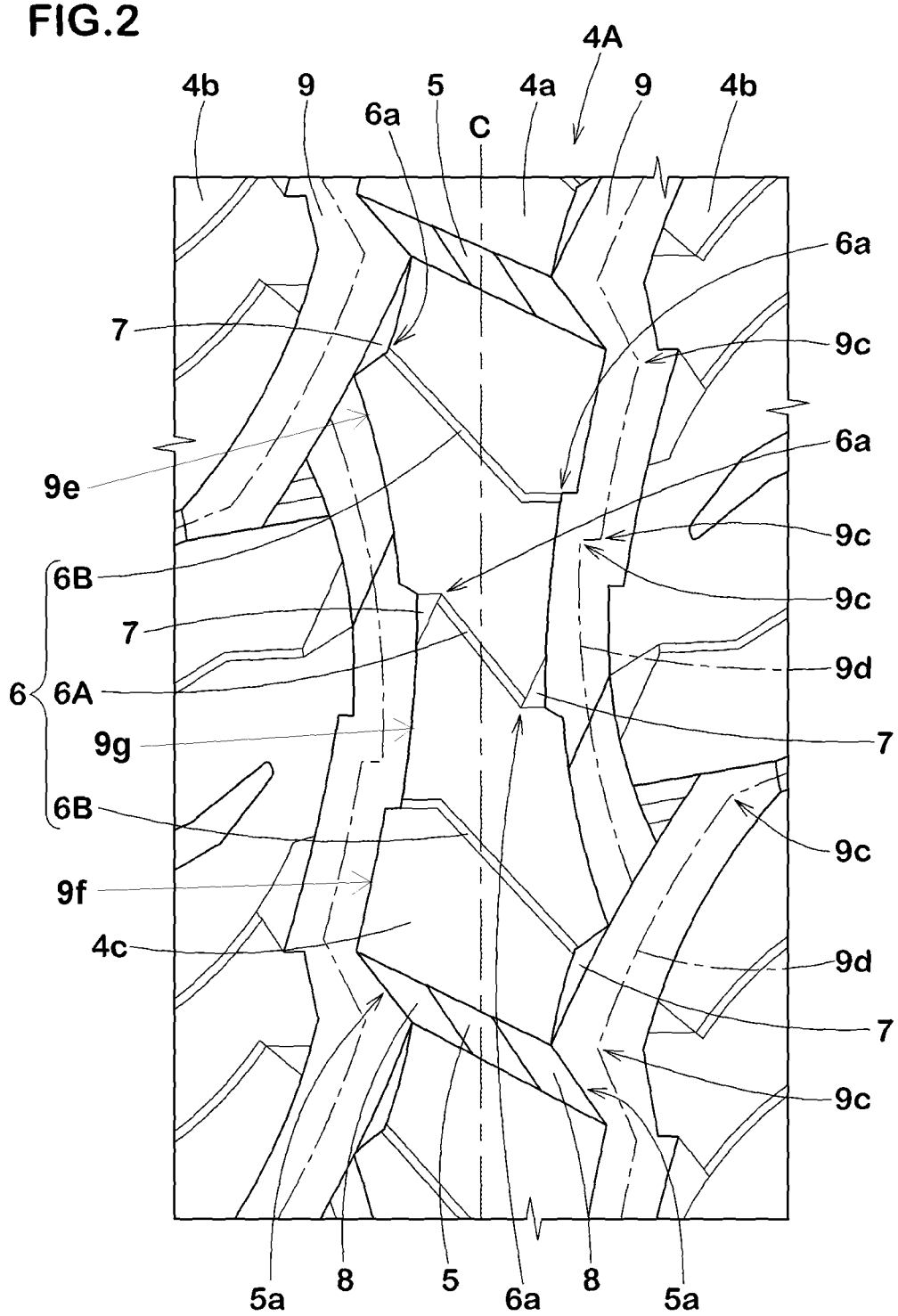
Figure 3:
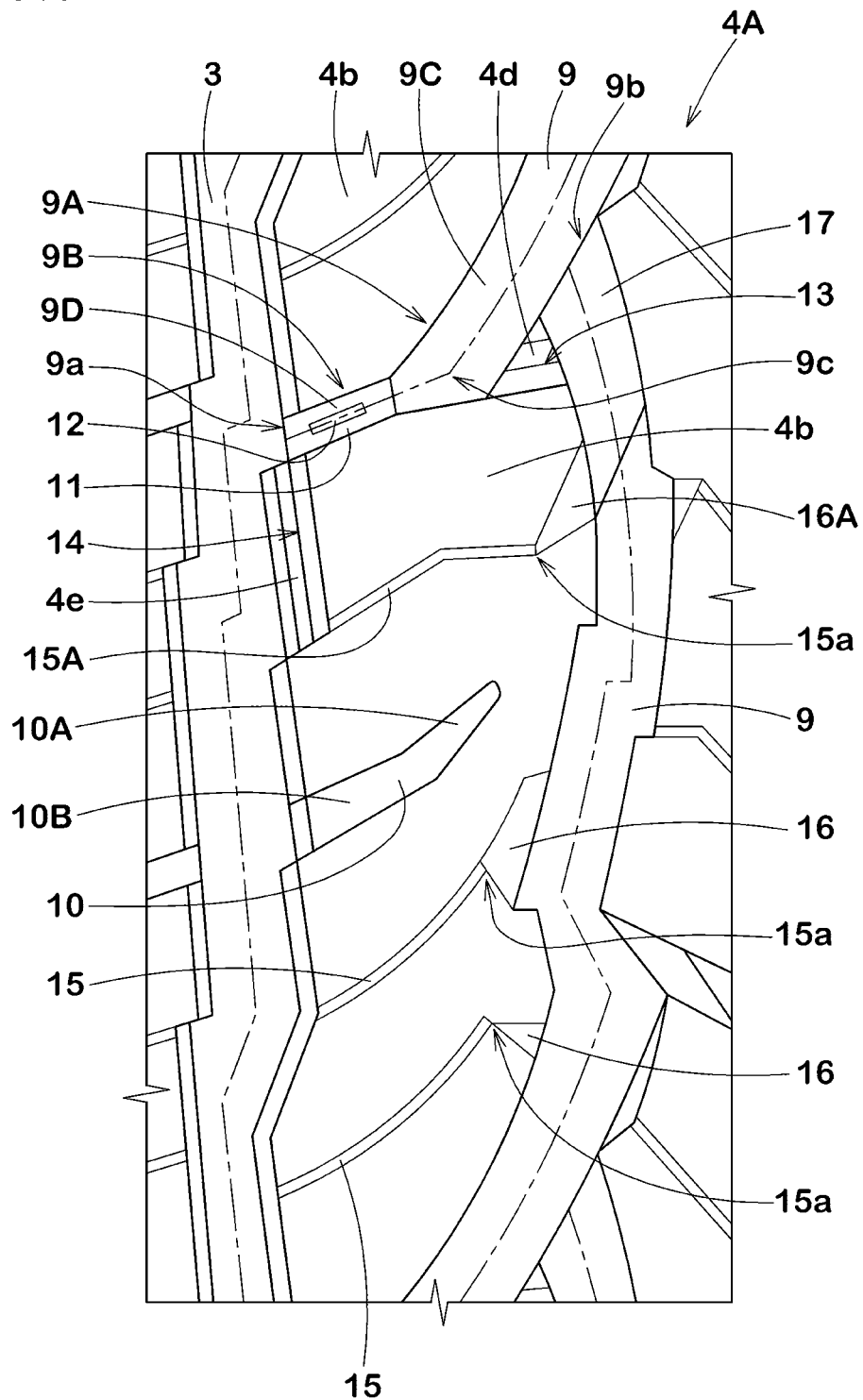
Figure 4:
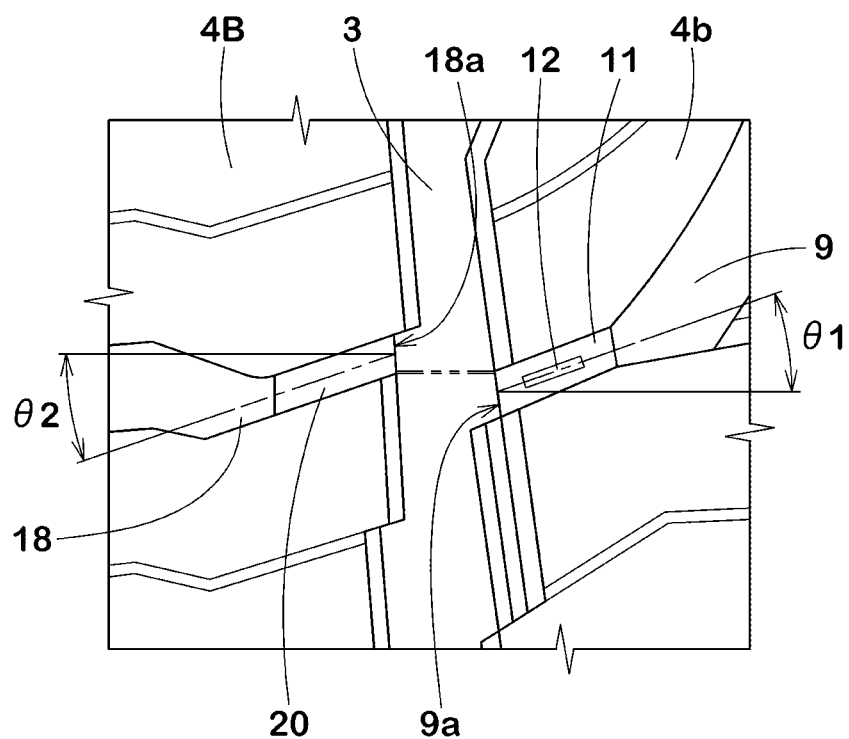
Figure 5:
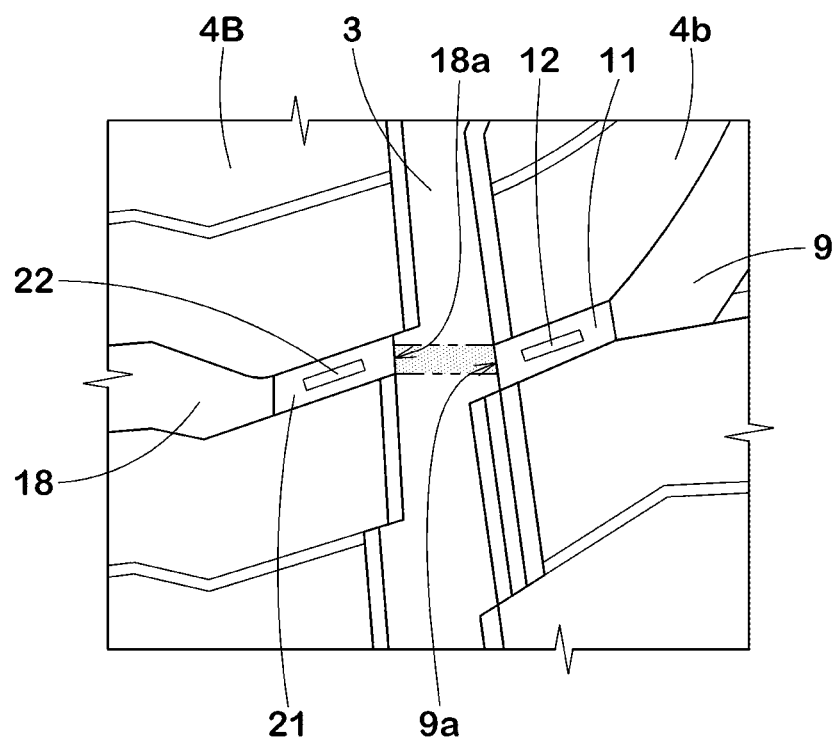

FIG. 1 is a development view of a tread portion in accordance with an embodiment of the present disclosure;
FIG. 2 is a partial enlarged view of a crown land portion:
FIG. 3 is a partial enlarged view of a side block;
FIG. 4 is a partial enlarged view of a circumferential groove; and
FIG. 5 is a partial enlarged view of the circumferential grooves in accordance with another embodiment.

DESCRIPTION OF THE PREFERRED EMBODIMENTS

An embodiment of the present disclosure will be explained below with reference to the accompanying drawings.

FIG. 1 illustrates a development view of a tread portion 2 of a tyre 1 in accordance with the present embodiment. As illustrated in FIG. 1, the tyre 1 according to the present embodiment is embodied as a pneumatic tyre with the tread portion 2 which is suitable for driving on snow road conditions.

The tyre 1, for example, may be embodied as a pneumatic tyre for driving on off-road conditions such as mud, besides snow road conditions. In addition, the tyre 1 is not limited to a pneumatic tyre, but can be embodied as a non-pneumatic tyre which can structurally support the tyre load without being inflated with a compressed air, for example.

The tread portion 2 according to the present embodiment is provided with a plurality of circumferential grooves 3 extending in the tyre circumferential direction, and a plurality of land portions 4 divided by the circumferential grooves 3. In the present embodiment, the circumferential grooves 3, for example, are provided such that one circumferential groove 3 is provided on either side of a region between the tyre equator C and a respective one of tread edges Te.

As used herein, the tread edges Te, when the tyre 1 is a pneumatic tyre, are the axial outermost edges of the ground contacting patch of the tyre 1 which occurs under a normal condition with a standard tyre load when the camber angle of the tyre is zero. The tyre equator C is the axial center location between the tread edges Te.

As used herein, the "normal condition" is such that the tyre 1 is mounted onto a standard wheel rim with a standard pressure but loaded with no tyre load. Unless otherwise noted, dimensions of respective portions of the tyre 1 are values measured under the normal condition.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

The tread portion 2 according to the present embodiment includes a crown land portion 4A defined between two circumferential grooves 3, and a shoulder land portion 4B disposed on either side of the tyre equator C between the adjacent circumferential groove 3 and the tread edge Te. As such, the land portions 4 according to the present embodiment include the crown land portion 4A and two shoulder land portions 4B.

Preferably, the circumferential grooves 3 extend in the tyre circumferential direction in a zigzag shape. Such circumferential grooves 3 can improve drainage performance upon driving on wet road conditions while ensuring traction upon driving on snow road conditions, thus improving on-snow performance and wet performance of the tyre 1.

The crown land portion 4A according to the present embodiment is provided with two or more crown grooves 9 extending inwardly of the crown land portion from the respective circumferential grooves 3. Each crown groove 9, for example, includes an outer end 9a opening to either one of the circumferential grooves 3 and an inner end 9b which is in communication with another one of the crown grooves 9 arranged adjacently thereto in the tyre circumferential direction. The crown grooves 9 according to the present embodiment extend in the tyre circumferential direction as a whole without traversing the tyre equator C.

Preferably, the crown land portion 4A includes a central region 4a defined between the adjacent crown grooves 9 in the tyre axial direction, and a plurality of side blocks 4b defined between the crown grooves 9 and a respective one of the circumferential grooves 3. In the present embodiment, a respective one of the side blocks 4b is formed in corresponding to a respective one of the crown grooves 9, on both sides of the central region 4a.

Preferably, each crown groove 9 includes wide-width regions 9A and narrow-width regions 9B having a groove width smaller than that of wide-width regions 9A, and the wide-width regions 9A and the narrow-width regions 9B are preferably alternated. In each crown groove 9 according to the present embodiment, the outer end 9a is formed as one of the narrow-width regions 9B, and the inner end 9b is formed as one of the wide-width regions 9A. Preferably, each crown groove 9 includes, between the outer end 9a and the inner end 9b, at least one of the other wide-width regions 9A and at least one of the other narrow-width regions 9B are provided.

Such a crown groove 9 can reduce viscous resistance of water against groove walls of the crown groove 9, improving wet performance of the tyre 1. In addition, in each crown groove 9, the wide-width regions 9A and the narrow-width regions 9B are alternated, helping to uniform stiffness of the crown land portion 4A so that uneven wear resistance of the tyre 1 can improve.

It is preferable that at least one of the wide-width regions 9A is formed as a groove-width-varying region where the groove width varies in the at least one of the wide-width regions. In addition, it is preferable that at least one of the narrow-width regions 9B is formed as a groove-width-varying region where the groove width varies in the at least one of the narrow-width regions. Further, the wide-width regions 9A and the narrow-width regions 9B, for example, may include a groove-width-constant region where the groove width is constant in the region. The outer end 9a of each crown groove 9 is formed as the groove-width-constant region. On the other hand, the inner end 9b of each crown groove 9 is preferably formed as the groove-width-varying region.

Here, a boundary between the adjacent wide-width region 9A and narrow-width region 9B is a position such that at least one of groove walls of the crown groove 9 varies rapidly. In addition, if both wide-width region 9A and narrow-width region 9B are formed as the groove-width-varying regions, the boundary is a center position of the groove-width-varying regions of the adjacent wide-width region 9A and narrow-width region 9B. Such wide-width regions 9A as well as narrow-width regions 9B can reduce viscous resistance of water against the groove walls further, improving wet performance of the tyre 1. Each crown groove 9, for example, includes two groove edges each with a plurality of bent portions in which adjacent two groove-edge elements are connected in a bent shape manner. Preferably, the plurality of bent portions has an angle about 90 degrees, e.g., 90 degrees plus or minus 20 degrees. Preferably, corner points of the plurality of bent portions of two groove edges are staggered from one another in the tyre circumferential direction.

FIG. 2 illustrates a partial enlarged view of the central region 4a of the crown land portion 4A. As illustrated in FIG. 2, each crown groove 9 is preferably configured in a zigzag shape having a plurality of bent portions 9c. Each crown groove 9, for example, may include a circular arc portion 9d extending in a circular arc shape between the adjacent bent portions 9c. Here, the shape of each crown groove 9 is defined based on a centerline in a groove width direction of each crown groove 9. In a portion in which one of the groove walls varies such as a boundary between the adjacent wide-width region 9A and narrow-width region 9B, the centerline shall not vary. As also illustrated in FIG. 2, in a tread plan view, each crown groove 9 further comprises an inner groove edge located inwardly in the tyre axial direction, the inner groove edge comprising a first arc portion 9e forming the inner end 9b; a second arc portion 9f located on an outer end side of the inner groove edge; and a third arc portion 9g between the first arc portion 9e and the second arc portion 9f. The first arc portion 9e, the second arc portion 9f and the third arc portion 9g are convex toward inward in the tyre axial direction, and the third arc portion 9g is offset inward in the tyre axial direction from the first arc portion 9e and the second arc portion 9f.

Each crown groove 9 can exert powerful traction upon driving on snow while preventing pattern noise upon driving on paved road, thus improving on-snow performance and noise performance of the tyre 1.

The central region 4a according to the present embodiment is provided with center lateral grooves 5 extending between the axially adjacent crown grooves 9, central sipes 6 extending between the axially adjacent crown grooves 9, and central recesses 7 extending inwardly in the tyre axial direction from the respective crown grooves 9. The central region 4a can prevent heel-and-toe wear as well as chipping upon driving on paved road and increase edge components for snow driving, thus improving on-snow performance and uneven wear resistance of the tyre 1.

The central region 4a according to the present embodiment is divided into a plurality of central blocks 4c by the center lateral grooves 5. Preferably, each central block 4c is provided with one or more central sipes 6 and one or more central recesses 7. The central blocks 4c can provide various edges which can scratch snow, improving on-snow performance of the tyre 1 further.

The center lateral grooves 5, for example, include end portions 5a connected to the crown grooves 9 which are adjacent in the tyre axial direction. It is preferable that at least one of the end portions 5a of each center lateral groove 5 is provided with a center tie-bar 8. In the present embodiment, the center tie-bar 8 is provided on both end portions 5 of each center lateral groove 5. Such a center lateral groove 5 with one or more center tie-bars 8 can enhance stiffness of each central block 4c, preventing heel-and-toe wear and chipping of each central block 4c so that uneven wear resistance of the tyre 1 can improve.

It is preferable that a depth of the end portions 5a of each center lateral groove 5 is in a range of from 30% to 60% of the maximum depth of the crown grooves 9. When the depth of the end portions 5a is less than 30% of the maximum depth of the crown grooves 9, a snow column formed by each center lateral groove 5 tends to be small, leading to a risk that on-snow performance of the tyre 1 deteriorates. When the depth of the end portions 5a is more than 60% of the maximum depth of the crown grooves 9, stiffness of each central block 4c may not be enhanced, leading to a risk that uneven wear resistance of the tyre 1 deteriorates.

Each central sipe 6, for example, includes end portions 6a in the tyre axial direction. It is preferable that at least one of the end portions 6a of each central sipe 6 is in communication with either one of the central recesses 7. Upon each central block 4c comes into contact with the ground, such a central sipe 6 can facilitate deformation of the central block 4c, improving snow-discharging performance of each crown groove 9 so that on-snow performance of the tyre 1 can improve.

In the present embodiment, the central sipes 6 includes at least one first central sipe 6A having both end portions 6a being connected to the respective central recesses 7, and at least one second central sipe 6B having one of the end portions 6a being connected to either one of the central recesses 7 and the other end portion 6a being connected to either one of bent portions 9c. The central sipes 6 which have the ends portions 6a connected to either one of the central recesses 7 or the bent portions 9c can facilitate deformation of the central blocks 4c further, improving on-snow performance of the tyre 1 further.

In each central sipe 6, for example, a depth of both end portions 6a is smaller than the maximum depth of a middle portion of the central sipe 6. The depth of the end portions 6a of each central sipe 6 is preferably in a range of from 20% to 40% of the maximum depth of the crown grooves 9. When the depth of the end portions 6a is less than 20% of the maximum depth of the crown grooves 9, each central block 4c is hardly deform upon grounding, leading to a risk that snow-discharging performance of the crown grooves 9 deteriorates. When the depth of the end portions 6a is more than 40% of the maximum depth of the crown grooves 9, stiffness of each central block 4c tends to decrease, leading to a risk that heel-and-toe wear and chipping occurs.

It is preferable that the maximum depth of the central recesses 7 is equal to or more than the depth of the end portions 6a of the central sipes 6. When the maximum depth of the central recesses 7 is less than the depth of the end portions 6a of the central sipes 6, the central recesses 7 may disappear earlier than the central sipes 6 due to tread wear by continuously using, leading to a risk that snow-discharging performance of the crown grooves 9 may deteriorate.

FIG. 3 illustrates a partial enlarged view of the crown land portion 4A. As illustrated in FIG. 3, each crown groove 9 includes a first inclined portion 9C extending at an angle with respect to the tyre axial direction, and a first axial portion 9D located outwardly in the tyre axial direction of the first inclined portion 9C extending along the tyre axial direction.

It is preferable that the first inclined portion 9C extends in a zigzag shape from the inner end 9b along the tyre circumferential direction. It is preferable that the first axial portion 9D extends in a straight shape from the outer end 9a along the tyre axial direction. Such a crown groove 9 having the first inclined portion 9C and the first axial portion 9D which are connected in a bent manner can form a firm snow column, improving on-snow performance of the tyre 1.

In the present embodiment, each first inclined portion 9C is provided with a crown tie-bar 17 on the inner end 9b side. The crown tie-bar 17, for example, extends from the inner end 9b to a respective one of the first recesses 16A which will be described later. The crown tie-bar 17 can enhance stiffness of the side block 4b, improving uneven wear resistance of the tyre 1.

A length of the crown tie-bars 17 is preferably in a range of from 20% to 40% of pitch lengths of the adjacent crown tie-bars 17 in the tyre circumferential direction. A height of the crown tie-bars 17 from a groove bottom of the crown groove 9 is preferably in a range of from 50% to 80% of the maximum depth of the crown groove 9. Thus, the depth of each crown groove 9 at the inner end 9b is in a range of from 20% to 50% of the maximum depth of the crown groove 9. Such crown tie-bars 17 can enhance stiffness of the side blocks 4b while ensuring drainage performance, thus improving wet performance and uneven wear resistance of the tyre 1.

It is preferable that each first inclined portion 9C which is adjacent to a respective one of the first axial portions 9D is formed as one of the wide-width regions 9A. In addition, it is preferable that each first axial portion 9D is formed as one of the narrow-width regions 9B. Thus, such a groove structure can suppress pattern noise when driving on paved road, improving noise performance of the tyre 1.

A groove width of the first axial portions 9D is preferably in a range of from 25% to 75% of a groove width of the first inclined portions 9C which are adjacent to the respective first axial portions 9D. Such first axial portions 9D can suppress pattern noise while ensuring stiffness of the side blocks 4b, improving noise performance and uneven wear resistance of the tyre 1.

In the present embodiment, the first axial portions 9D are provided with side tie-bars 11 on the outer ends 9a side. The side tie-bars 11 can suppress pattern noise and enhance stiffness of the side blocks 4b further, improving noise performance of the tyre 1 and uneven wear resistance of the tyre 1.

A height of the side tie-bars 11 from the groove bottoms of the crown grooves 9 is preferably in a range of from 50% to 80% of the maximum depth of the crown grooves 9. Thus, a depth of the crown grooves 9 at the outer ends 9a is in a range of from 20% to 50% of the maximum depth of the crown grooves 9. Such side tie-bars 11 can enhance stiffness of the side blocks 4b while suppressing pattern noise, thus improving noise performance and uneven wear resistance of the tyre 1.

It is preferable that the side tie-bars 11 are provided with first tie-bar sipes 12 each have both ends terminating within the respective side tie-bars 11. The first tie-bar sipes 12 help to increase edge components for snow driving without increasing pattern noise when driving on paved road, thus improving on-snow performance and noise performance of the tyre 1.

A depth of each first tie-bar sipe 12 is preferably in a range of from 75% to 100% of a height of the side tie-bars 11 from the bottom of the crown groove 9. Such a first tie-bar sipe 12 can be suitable to improve on-snow performance and noise performance of the tyre 1 in a well-balanced manner.

FIG. 4 illustrates a partial enlarged view of one of the circumferential grooves 3. As illustrated in FIG. 4, an angle θ1 of the crown grooves 9 at the outer ends 9a is preferably in a range of from 5 to 10 degrees with respect to the tyre axial direction. When the angle θ1 is less than 5 degrees, there is a risk that pattern noise becomes large, deteriorating reduction effect of noise performance. When the angle θ1 is more than 10 degrees, there is a risk that snow-discharging performance of the crown grooves 9 may be decreased, deteriorating on-snow performance of the tyre 1.

As illustrated in FIG. 3, it is preferable that each side block 4b is provided with a side groove 10 which extends inwardly in the tyre axial direction from the circumferential groove 3 and terminates within the side block 4b. In the present embodiment, the side groove 10 includes a second inclined portion 10A which is inclined at an angle with respect to the tyre axial direction and which is located inwardly in the tyre axial direction, and a second axial portion 10B which extends along the tyre axial direction and which is located outwardly of the second inclined portion 10A. The second axial portion 10B has a smaller angle with respect to the tyre axial direction than that of the second inclined portion 10A. Such a side groove 10 with the second inclined portion 10A and the second axial portion 10B which are connected in a bent manner can form a firm snow column when driving on snow, improving on-snow performance of the tyre 1.

In the present embodiment, each side block 4b, in a tread plan view, preferably includes a first corner portion 4d formed between the adjacent crown grooves 9 in the tyre circumferential direction. The first corner portion 4d is adjacent to the inner end 9b of one of the adjacent crown grooves 9 and is tapered. The first corner portion 4d can dig into snow when driving on snow, improving on-snow performance of the tyre 1.

In the present embodiment, the first corner portion 4d is provided with a step portion 13 extending stepwise inwardly in the tyre radial direction. The step portion 13 includes two or more steps, e.g., three steps in the present embodiment. The step portion 13 can increase edge components for snow driving while preventing the tip end of the first corner portion 4d from grounding upon driving on paved road, thus improving on-snow performance and uneven wear resistance of the tyre 1.

Each side block 4b includes a first block sidewall 4e extending along the circumferential groove 3. The first block sidewall 4e is provided with a step portion 14 extending stepwise inwardly in the tyre radial direction. The step portion 14, for example, includes three steps. It is preferable that the step portion 14 is provided adjacent to the outer end 9a of either one of the crown grooves 9. Such a step portion 14 can increase circumferential edge components for snow driving, improving on-snow performance of the tyre 1. In addition, the step portion 14 can reduce viscous resistance of water against the crown groove 9, improving wet performance of the tyre 1 further.

It is preferable that each side block 4b is provided with two or more side sipes 15 extending from the circumferential groove 3 toward either one of the crown grooves 9, and two or more side recesses 16 recessed inwardly from the crown groove 9. For example, the side sipes 15 have ends 15a on the crown groove 9 side and the ends 15a are in communication with the respective side recesses 16. Such side sipes 15, when the side block 4b comes into contact with the ground, facilitate deformation of the side block 4b so that snow-discharging performance of the crown grooves 9 can improve. Thus, on-snow performance of the tyre 1 can improve.

Preferably, the side sipes 15 include at least one first side sipe 15A extending from the first block sidewall 4e. Preferably, the side recesses 16 include at least one first recess 16A with which the first side sipe 15A is in communication. Such a first side sipe 15A which has one end in communication with the first block sidewall 4e and the other end in communication with the side recess 16 can facilitate deformation of the side block 4b further, improving on-snow performance of the tyre 1.

As illustrated in FIG. 1, each shoulder land portion 4B, for example, is provided with shoulder lateral grooves 18 extending from the circumferential grooves 3 to the tread edge Te, and shoulder sipes 19 extending outwardly in the tyre axial direction from the circumferential groove 3 and terminating within the shoulder land portion 4B.

In the present embodiment, each shoulder land portion 4B is divided into shoulder blocks 4f by the shoulder lateral grooves 18. It is preferable that each shoulder block 4f is provided with a plurality of shoulder sipes 19. Such a shoulder block 4f can increase edge components for snow driving, improving on-snow performance of the tyre 1.

Preferably, the shoulder lateral grooves 18 extend in a zigzag shape. Such shoulder lateral grooves 18 can reduce pattern noise when driving on paved road, improving noise performance of the tyre 1.

As illustrated in FIG. 4, the shoulder lateral grooves 18 include shoulder ends 18a which are in communication with the circumferential groove 3 at locations where the shoulder ends 18a overlap the respective outer end 9a at least partially in the tyre circumferential direction. Such shoulder lateral grooves 18, through the circumferential grooves 3, can be connected to the respective crown grooves 9 smoothly, enabling to form firm snow columns at groove intersections on the circumferential grooves 3 when driving on snow, improving on-snow performance of the tyre 1.

It is preferable that a length in the tyre circumferential direction of an overlap portions between the respective adjacent shoulder ends 18a and the outer ends 9a is equal to or less than 25% of a length in the tyre circumferential direction of the outer ends 9a. Such shoulder lateral grooves 18 and crown grooves 9 can have less opportunity grounding at the same time with one another when driving, improving noise performance of the tyre 1.

It is preferable each shoulder lateral groove 18 is provided with a shoulder tie-bar 20 on a side of the shoulder end 18a. The shoulder tie-bar 20 can enhance stiffness of the shoulder land portion 4B while ensuring better drainage performance, improving wet performance and uneven wear resistance of the tyre 1.

A height of the shoulder tie-bar 20 from the groove bottom of each shoulder lateral groove 18 is preferably in a range of from 50% to 80% of the maximum depth of the shoulder lateral groove 18. Such shoulder tie-bar 20 can enhance stiffness of the shoulder land portion 4B while reducing pattern noise, improving noise performance and uneven wear resistance of the tyre 1.

An angle θ2 of the shoulder lateral grooves 18 at the respective shoulder ends 18a is preferably in a range of from 5 to 10 degrees with respect to the tyre axial direction. When the angle θ2 is less than 5 degrees, there is a risk that pattern noise becomes large, deteriorating noise performance of the tyre 1. When the angle θ2 exceeds 10 degrees, there is a risk that snow-discharging performance becomes low, deteriorating on-snow performance of the tyre 1.

FIG. 5 illustrates a partial enlarged view of one of the circumferential grooves 3 in accordance with another embodiment. Note that like reference numerals refer to the like elements or parts throughout, and that redundant description of already described elements is omitted. As illustrated in FIG. 5, in the shoulder lateral grooves 18, the shoulder ends 18a are arranged such that the shoulder ends 18a overlap the respective outer end 9a of the crown grooves 9 in the tyre circumferential direction, and a length of the overlap portions between the respective adjacent shoulder ends 18a and the outer ends 9a is equal to or more than 50% of a length in the tyre circumferential direction of the outer ends 9a. Such shoulder lateral grooves 18, in cooperation with the crown grooves 9, can form firm snow columns at the groove intersection on the circumferential grooves 3 when driving on snow, improving on-snow performance of the tyre 1 further.

In this embodiment, the shoulder lateral grooves 18 are provided with shoulder tie-bars 21 on a side of the shoulder ends 18a. It is preferable that the shoulder tie-bars 21 are provided with second tie-bar sipes 22 each of which has both ends terminating within a respective one of the shoulder tie-bars 21. The second tie-bar sipes 22 can increase edge components for snow driving without increasing pattern noise, improving on-snow performance and noise performance of the tyre 1.

A depth of the second tie-bar sipes 22 is preferably in a range of from 75% to 100% of a height of the shoulder tie-bars 21 from the groove bottom of the shoulder lateral grooves 18. Such second tie-bar sipes 22 can be helpful to improve on-snow performance and noise performance of the tyre 1 in a well-balanced manner.

While the particularly preferable embodiments in accordance with the present disclosure have been described in detail, the present disclosure is not limited to the illustrated embodiments, but can be modified and carried out in various aspects.

EXAMPLE

Tyres having the basic tread pattern shown in FIG. 1 were manufactured by way of trial based on the detail shown in Tables 1 and 2. Then, wet performance and uneven wear resistance of each test tyre was tested. The common specification and the test method are as follows.
Common Specification:
Tyre size: 265/65R17 112S
Rim size: 17×8.0 J
Inner pressure: 220 kPa
Wet Performance Test:

Each test tyre set was mounted onto all wheels of a middle size SUV. Then, a test driver drove the SUV on a test course with a wet asphalt road, and evaluated grip performance by the driver's sense. The test results are shown in Tables 1 and 2 using an index based on Reference being 100. The larger value indicates the better drainage performance, i.e., better wet performance.
Uneven Wear Resistance Test:

Using a wear energy measurement device, wear energy of some portions of the tread portion of each test tyre was measured. The test results are shown in Tables 1 and 2 using an index based on Reference 1 being 100. The larger value indicates less dispersion of wear energy, i.e., better uneven wear resistance.

The test results are shown in Tables 1 and 2.

TABLE 1

|  | Ref. | Ex. 1 | Ex. 2 | Ex. 3 | Ex. 4 | Ex. 5 | Ex. 6 |
| --- | --- | --- | --- | --- | --- | --- | --- |
| Repetition of wide-width regions and narrow-width regions | none | presence | presence | presence | presence | presence | presence |
| Side tie-bar height/maximum depth of crown grooves (%) | 100 | 65 | 0 | 40 | 90 | 100 | 65 |
| Crown tie-bar height/maximum depth of crown grooves (%) | 100 | 65 | 65 | 65 | 65 | 65 | 0 |
| Groove width of first axial portions/groove width of first inclined portions adjacent to first axial portions (%) | 100 | 50 | 50 | 50 | 50 | 50 | 50 |
| Step portions of first block sidewalls | none | presence | presence | presence | presence | presence | presence |
| Wet performance (index) | 100 | 105 | 107 | 105 | 103 | 102 | 106 |
| Uneven wear resistance (index) | 100 | 116 | 113 | 115 | 117 | 117 | 108 |

TABLE 2

|  | Ex. 7 | Ex. 8 | Ex. 9 | Ex. 10 | Ex. 11 | Ex. 12 |
| --- | --- | --- | --- | --- | --- | --- |
| Repetition of wide-width regions and narrow-width regions | presence | presence | presence | presence | presence | presence |
| Side tie-bar height/maximum depth of crown grooves (%) | 65 | 65 | 65 | 65 | 65 | 65 |
| Crown tie-bar height/maximum depth of crown grooves (%) | 40 | 90 | 100 | 65 | 65 | 65 |
| Groove width of first axial portions/groove width of first inclined portions adjacent to first axial portions (%) | 50 | 50 | 50 | 20 | 80 | 50 |
| Step portions of first block sidewalls | presence | presence | presence | presence | presence | none |
| Wet performance (index) | 105 | 101 | 101 | 101 | 106 | 101 |
| Uneven wear resistance (index) | 110 | 118 | 119 | 118 | 113 | 115 |

From the test results, it is confirmed that the example tyres improve both wet performance and uneven wear resistance as compared with the reference tyres.

What is claimed is:

1. A tyre comprising:
a tread portion being provided with two circumferential grooves extending in a tyre circumferential direction to form a crown land portion therebetween, wherein
the crown land portion is provided with two or more crown grooves extending inwardly of the crown land portion from the respective circumferential grooves,
each crown groove comprises wide-width regions and narrow-width regions having a groove width smaller than that of the wide-width regions,
the wide-width regions and the narrow-width regions are alternated,
each crown groove comprises an outer end opening to either one of the circumferential grooves and an inner end being in communication with another one of the crown grooves arranged adjacently in the tyre circumferential direction,
in a tread plan view, each crown groove comprises an inner groove edge located inwardly in the tyre axial direction,
the inner groove edge comprises
a first arc portion forming the inner end,
a second arc portion located on an outer end side of the inner groove edge, and
a third arc portion between the first arc portion and the second arc portion,
the first arc portion, the second arc portion and the third arc portion are convex toward inward in the tyre axial direction, and
the third arc portion is offset inward in the tyre axial direction from the first arc portion and the second arc portion.

2. The tyre according to claim 1, wherein
each crown groove comprises a first inclined portion extending along the tyre circumferential direction from the inner end, and
the first inclined portion is provided with a crown tie-bar on the inner end side.

3. The tyre according to claim 2, wherein
each crown groove comprises a first axial portion extending along a tyre axial direction from the outer end, and
the first axial portion is provided with a side tie-bar on the outer end side.

4. The tyre according to claim 2, wherein
the outer end is formed as one of the narrow-width regions.

5. The tyre according to claim 2, wherein
the crown land portion comprises two or more side blocks defined by the crown grooves and the circumferential grooves,
each side block comprises a first block sidewall extending along either one of the circumferential grooves, and
the first block sidewall comprises a step portion extending stepwise in a tyre radial direction.

6. The tyre according to claim 1, wherein
each crown groove comprises a first axial portion extending along a tyre axial direction from the outer end, and
the first axial portion is provided with a side tie-bar on the outer end side.

7. The tyre according to claim 6, wherein
the outer end is formed as one of the narrow-width regions.

8. The tyre according to claim 6, wherein
the crown land portion comprises two or more side blocks defined by the crown grooves and the circumferential grooves,
each side block comprises a first block sidewall extending along either one of the circumferential grooves, and
the first block sidewall comprises a step portion extending stepwise in a tyre radial direction.

9. The tyre according to claim 1, wherein
the outer end is formed as one of the narrow-width regions.

10. The tyre according to claim 9, wherein
the crown land portion comprises two or more side blocks defined by the crown grooves and the circumferential grooves,
each side block comprises a first block sidewall extending along either one of the circumferential grooves, and
the first block sidewall comprises a step portion extending stepwise in a tyre radial direction.

11. The tyre according to claim 1, wherein
the crown land portion comprises two or more side blocks defined by the crown grooves and the circumferential grooves,
each side block comprises a first block sidewall extending along either one of the circumferential grooves, and
the first block sidewall comprises a step portion extending stepwise in a tyre radial direction.

12. The tyre according to claim 1, wherein
at least one of the wide-width regions has a groove width varying in the at least one of the wide-width regions.

13. The tyre according to claim 1, wherein
at least one of the narrow-width regions has a groove width varying in the at least one of the narrow-width regions.

14. The tyre according to claim 1, wherein
the crown grooves extend in the tyre circumferential direction without traversing a tyre equator.

15. The tyre according to claim 1, wherein
the crown grooves extend in a zigzag shape in the tyre circumferential direction.

16. The tyre according to claim 15, wherein
each crown groove has two groove edges each with a plurality of bent portions in which two adjacent groove-edge elements are connected in a bent manner, and
an angle between the two groove-edge elements of the plurality of bent portions is 90 degrees plus or minus 20 degrees.

17. The tyre according to claim 16, wherein
the plurality of bent portions of two groove edges is staggered with one another in the tyre circumferential direction.

* * * * *